(12) United States Patent
Rodriguez et al.

(10) Patent No.: US 11,749,807 B2
(45) Date of Patent: Sep. 5, 2023

(54) ELECTRICALLY CONDUCTIVE ELEMENT

(71) Applicant: COMMISSARIAT A L'ENERGIE ATOMIQUE ET AUX ENERGIES ALTERNATIVES, Paris (FR)

(72) Inventors: Guillaume Rodriguez, Grenoble (FR); Christophe Dubarry, Grenoble (FR); Aomar Halimaoui, Grenoble (FR); Magali Tessaire, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 108 days.

(21) Appl. No.: 17/097,730

(22) Filed: Nov. 13, 2020

(65) Prior Publication Data
US 2021/0257623 A1 Aug. 19, 2021

(30) Foreign Application Priority Data
Nov. 14, 2019 (FR) .................................. 19 12695

(51) Int. Cl.
*H01M 4/66* (2006.01)
*H01M 10/0585* (2010.01)

(52) U.S. Cl.
CPC ........... *H01M 4/667* (2013.01); *H01M 4/661* (2013.01); *H01M 4/664* (2013.01); *H01M 10/0585* (2013.01)

(58) Field of Classification Search
CPC ...... H01M 4/667; H01M 4/661; H01M 4/664; H01M 10/0585
See application file for complete search history.

(56) References Cited

U.S. PATENT DOCUMENTS

| 6,117,689 A * | 9/2000 | Summerfelt ............ H01L 28/60 257/E21.295 |
| 2001/0011754 A1 | 8/2001 | Koike et al. |
| 2001/0024868 A1 * | 9/2001 | Nagel .................... H01L 28/75 438/496 |

(Continued)

FOREIGN PATENT DOCUMENTS

| CN | 102760776 A * | 10/2012 |
| CN | 102760776 A | 10/2012 |

(Continued)

OTHER PUBLICATIONS

French Preliminary Search Report dated Aug. 4, 2020 in French Application 19 12695 filed Nov. 14, 2019 (with English Translation of Categories of Cited Documents and Written Opinion), 19 pages.

(Continued)

*Primary Examiner* — Brian R Ohara
*Assistant Examiner* — Emily Elizabeth Freeman
(74) *Attorney, Agent, or Firm* — Oblon, McClelland, Maier & Neustadt, L.L.P.

(57) ABSTRACT

A microelectronic device is provided, including: a support; and an electrically conductive element including in a stack and successively above a first face of the support, a first layer based on a metal and a second layer, in contact with the first layer, based on a material selected from among MoSi and WSi$_y$. A method for manufacturing the microelectronic device is also provided.

19 Claims, 4 Drawing Sheets

(56) References Cited

U.S. PATENT DOCUMENTS

| | | | |
|---|---|---|---|
| 2007/0243452 A1* | 10/2007 | Weidman | H01M 8/0236 |
| | | | 429/514 |
| 2008/0003496 A1 | 1/2008 | Neudecker et al. | |
| 2008/0032236 A1 | 2/2008 | Wallace et al. | |
| 2013/0230646 A1 | 9/2013 | Wallace et al. | |
| 2015/0102530 A1 | 4/2015 | Wallace et al. | |
| 2015/0171455 A1* | 6/2015 | Mills | H01M 8/144 |
| | | | 429/422 |
| 2017/0149093 A1* | 5/2017 | Sun | H01M 10/0404 |
| 2019/0214674 A1* | 7/2019 | Lim | H01M 10/0583 |

FOREIGN PATENT DOCUMENTS

| | | |
|---|---|---|
| EP | 1 122 225 A1 | 8/2001 |
| JP | 1-192140 A | 8/1989 |

OTHER PUBLICATIONS

Van Ommen, A. H et al., "Influence of microstructure on the resistivity of $MoSi_2$ thin films," Journal of Applied Physics, vol. 64, No. 7, Oct. 1, 1988, XP055708369, 8 pages.

European Search Report dated Apr. 8, 2021 in European Patent Application No. 20207316.9 (with English translation of categories of cited documents), 8 pages.

* cited by examiner

[Fig. 1]
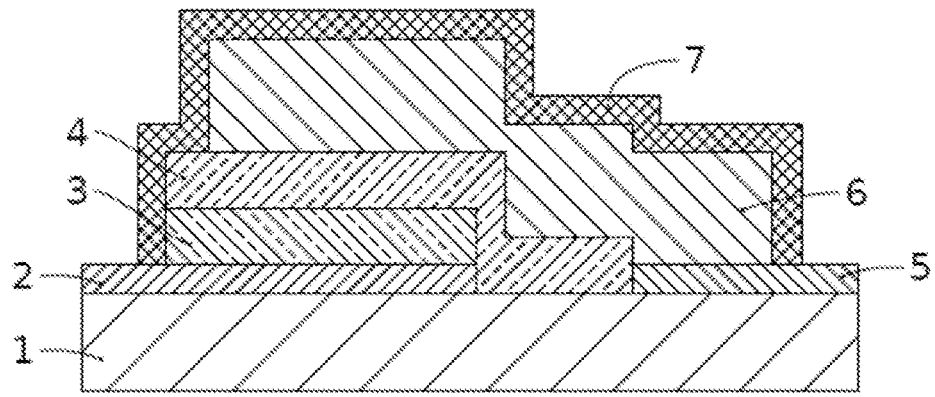
[Fig. 2A]
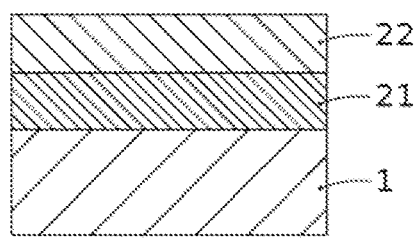
[Fig. 2B]
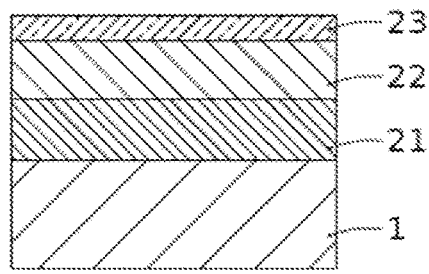
[Fig. 2C]
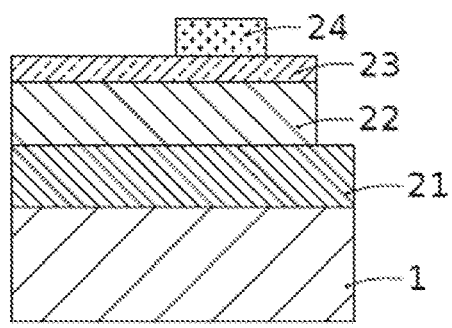

[Fig. 3]
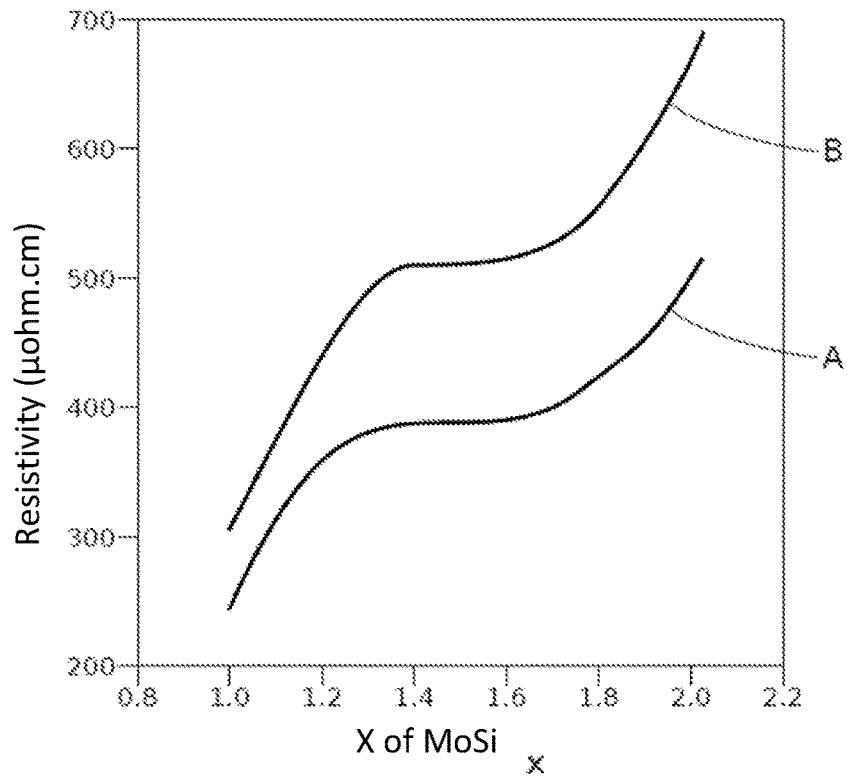
[Fig. 4]
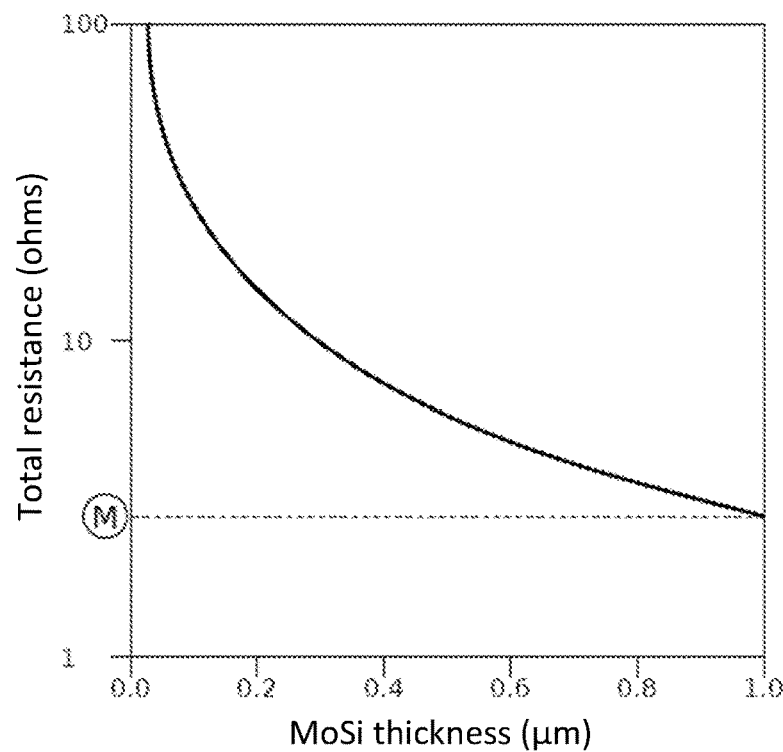

[Fig. 5]
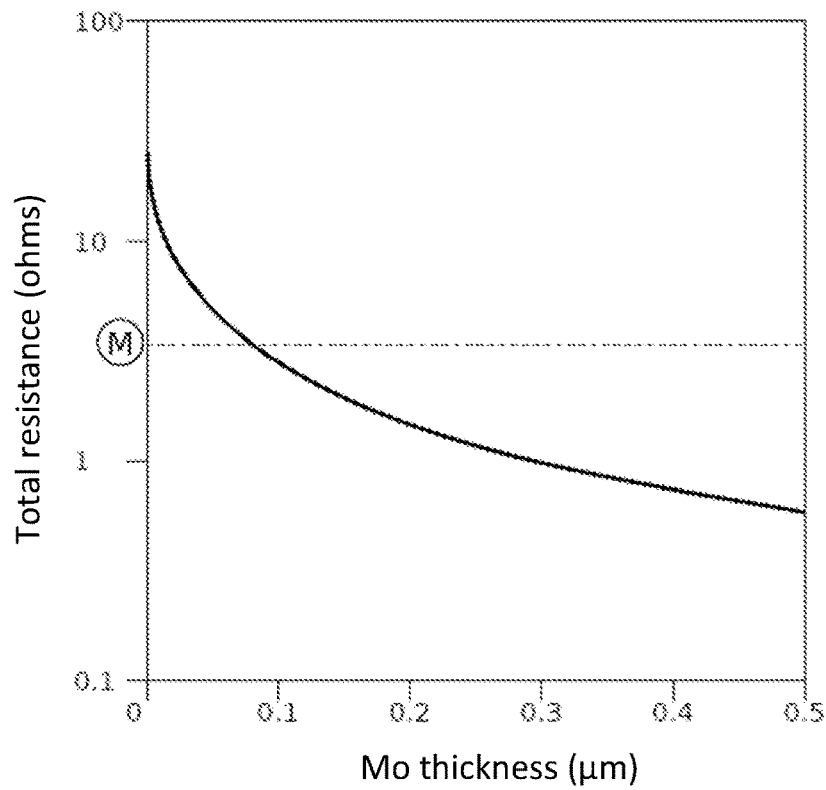
Mo thickness (μm)
[Fig. 6]
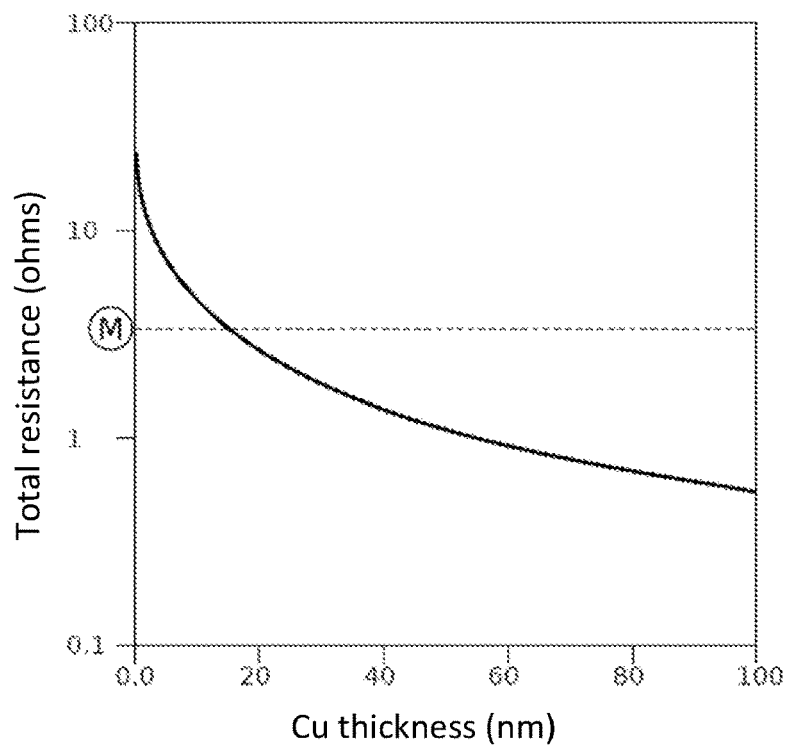
Cu thickness (nm)

[Fig. 7]
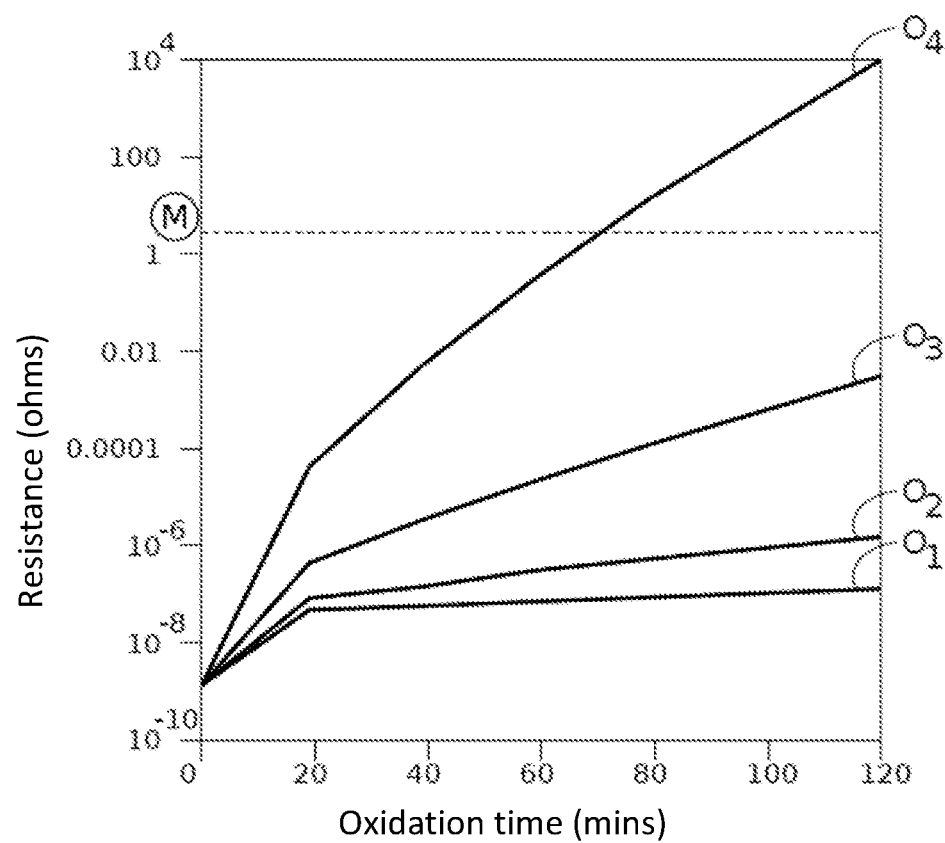

ELECTRICALLY CONDUCTIVE ELEMENT

TECHNICAL FIELD

The present invention relates to the field of electrically conductive elements for microelectronic devices. By "microelectronic device", this means any type of device made with microelectronic means. These devices comprise, in particular, in addition, devices with a purely electronic purpose, micromechanical or electromechanical devices (MEMS, NEMS, etc.), as well as optical or optoelectronic devices (MOEMS, etc.).

In particular, microelectronic devices having electrodes are outlined, in the field of storing energy electrochemically, in particular in the form of a microbattery (thus producing an electrochemical microstorage component). The invention has the application of manufacturing of microelectronic devices offering such a storage. This includes, in particular, devices of the battery type, accumulator or condenser using an electrolyte, preferably solid.

Microelectronic devices are also outlined, having electrodes in electroactive layer stacks, like piezoelectric layers, in particular to produce sensors or actuators; these can be devices using PZT ceramic type materials ($PbZrTiO_3$).

Moreover, still in a non-limiting manner, the invention is also of interest for producing microelectronic devices including microelectronic circuits, in particular for radiofrequency transmitter/receiver circuit portions, for example to form capacity or induction portions, or electric contact portions for such circuits; these can be filter portions for mobile telephony, for example implementing materials having high coupling coefficients, like $LiNbO_3$ or $LiTaO_3$.

STATE OF THE ART

To take the case of storing electrochemical energy, the current systems are, generally, produced by successive depositions on a substrate of a first current collector, of a first electrode, of an electrolyte or ionic conductor, of a second electrode, and of a second current collector. An encapsulation, by way of additional layer deposition, or by cap extension, is often necessary to protect the chemical reactivity system from oxygen and water vapour.

The current collectors, each connected to one of the different electrodes, are accessible through the outside of the stack of the electrochemical storage device, for a contact point. The first electrode (or positive electrode used in a conventional lithium or sodium accumulator) is potentially usable in a microbattery, and the most common is $LiCoO_2$.

This type of component has the disadvantage of having at least one high thermal budget step during the technological method thereof. In particular, in the case of $LiCoO_2$ mentioned above for the formation of the first electrode, generally a thermal oxidation under air or under dioxygen is carried out, of which the purpose is to crystallise the material of the first electrode; frequently, the temperatures of this thermal treatment are comprised between 500 and 700° C.

This particularity conditions restrictive specifications on the first current collector. Indeed, the current collector must conserve the electric conduction properties thereof after a treatment at a high temperature under an oxidising atmosphere. Conventionally, the material used is platinum, an expensive material, but capable of conserving the electric conduction properties thereof after the thermal treatment through the almost-zero oxidability. When other materials are used, the degradation of the effectiveness of the microelectronic device is significant, due to the oxidation of the conductive portions induced by the thermal treatment.

Generally, forming microelectronic device portions having good electric conduction properties is always difficult, as there are not very many quality electric conductors which resist oxidation, and they are expensive.

An aim of the present invention is therefore to propose an alternative to electricity conductors which are currently resorted to.

SUMMARY

To achieve this aim, according to an embodiment, a microelectronic device is provided, comprising a support and an electrically conductive element comprising, in a stack and successively above a first face of the support, a first layer based on a metal and a second layer, in contact with the first layer, based on a material selected from among $MoSi_x$ and $WSi_y$.

This association of material layers selected ensures a very satisfactory level of electric conductivity, since it is easy to reach less than 3 ohms of electric resistance. At the same time, the MoSi or WSi-based layer effectively protects the underlying layer, in particular against oxidation.

A favoured, but non-limiting application relates to devices involving thermal treatments in the presence of dioxygen. It is not excluded that a thin layer of oxide is formed on the surface of the second layer in such contexts, but the thickness thereof is so low, through the materials selected, that this does not impact, in practice, the conductivity of the assembly.

Potential uses of the electrically conductive element are the formation of all or some of an electrode of an electroactive layer system, of a current collector, share of circuits, in particular radiofrequency transmitter/receiver circuits.

Preferably, but optionally, the $MoSi_x$ selected is such that x=1, i.e. that it is MoSi. While this material is revealed to be more crystalline than other solutions, like $MoSi_2$, which is almost amorphous, the applicant has obtained surprising results, more favourable with MoSi.

Another aspect relates to a method for manufacturing a microelectronic device comprising an electrically conductive element, the method comprising a supply of a support and, above a first face of the support, a formation of a stack comprising successively a formation of a first layer based on a metal, and, in contact with the first layer, a formation of a second layer based on a material selected from among $MoSi_x$ and $WSi_y$.

BRIEF DESCRIPTION OF THE FIGURES

The aims, objectives, as well as the features and advantages will emerge better from the detailed description of an embodiment which is illustrated by the following supporting drawings, wherein:

FIG. 1 represents an example of application context of the invention.

FIG. 2A represents a possible stack.

FIG. 2B shows a variation of FIG. 2A with a superficial layer.

FIG. 2C schematises a switching-in of the conductive element.

FIG. 3 is a graph showing the evolution of the electric resistivity of the conductive element according to the parameter x.

FIG. 4 is a graph showing the evolution of the total electric resistance of the conductive element according to the thickness of the second layer.

FIG. 5 is a graph showing the evolution of the total electric resistance of the conductive element according to the thickness of the first layer, made of Mo.

FIG. 6 is a graph showing the evolution of the total electric resistance of the conductive element according to the thickness of the first layer, made of Cu.

FIG. 7 is a graph showing the evolution of the electric resistance of an oxide layer of the conductive layer in different situations of thermal treatment under dioxygen.

The drawings are given as examples and are not limiting of the invention. They constitute principle schematic representations intended to facilitate the understanding of the invention and are not necessarily to the scale of practical applications.

DETAILED DESCRIPTION

Before starting a detailed review of embodiments of the invention, optional features are stated below, which can optionally be used in association or alternatively:
the material selected is $MoSi_x$, with X=1;
the material selected is $WSi_y$, preferably $WSi_2$ or $W_3Si_5$;
the thickness of the second layer 22 is less than or equal to 100 nm;
the metal is selected from among: Cu, Mo, W, Al, Cr, Ni;
the electrically conductive element comprises, above and in contact with at least one portion of the second layer 22, an oxide layer 23 of the material of the second layer 22;
the electrically conductive element is a battery collector;
the device comprises a first current collector 2 formed at least partially by the electrically conductive element, a first electrode 3, a solid active layer 4, a second electrode 6 and a second current collector 5;
the electrically conductive element forms at least partially an electrically conductive electrode connected to an electroactive member;
the electric component forms at least partially an electric circuit portion, preferably an antenna portion, a portion of an inductive element, a portion of a capacitive element.

The invention also relates to a method for manufacturing a microelectronic device comprising an electrically conductive element, the method comprising a supply of a support 1 and, above a first face of the support 1, a formation of a stack comprising successively a formation of a first layer 21 with the basis of a metal, and, in contact with the first layer, a formation of a second layer 22 with the basis of a material selected from among $MoSi_x$ and $WSi_y$, wherein:
the formation of the second layer 22 comprises a deposition by a co-spraying or a spraying of a mixture, respectively, of Mo and of Si or of W and of Si, on a face of the first layer 21;
the formation of the second layer 22 comprises an alternate deposition, on a face of the first layer 21, of at least a sublayer, respectively, of Mo or of W, and of at least one Si sublayer;
the formation of the second layer 22 comprises, after the deposition, a thermal treatment configured to form $MoSi_x$ or, respectively, $WSi_y$ molecules;
the thermal treatment is performed in the presence of dioxygen;
the method is configured to manufacture a microelectronic device for storing electrochemical energy, including a step of forming an electrode, the thermal treatment being configured to produce a crystallisation annealing of the electrode;
the electrode is LiCo-based, the thermal treatment being configured to produce a crystallisation annealing of the electrode so as to form $LioO_2$;
the method is configured such that the electric resistance of the electrically conductive element is less than or equal to 3 ohms.

It is specified that, in the scope of the present invention, the term "on" or "above" does not compulsorily mean "in contact with". Thus, for example, the deposition of a layer on another layer or on a support, does not compulsorily mean that these two portions are directly in contact with one another, but this means that one covers the other at least partially, by being, either directly in contact with it, or by being separated from it by a film, or also another layer or another element. A layer can moreover be composed of several sublayers of one same material or of different materials.

It is specified that in the scope of the present invention, the thickness of a layer or of the support is measured along a direction perpendicular to the surface according to which this layer or this support has the maximum extension thereof.

Some portions of the device of the invention can have an electric function. Some are used for electric conduction properties and by electrode, collector or equivalent, this means elements formed from at least one material having a sufficient electric conductivity, in the application, to achieve the desired function. Conversely, by electric or dielectric insulator, this means a material which, in the application, ensures an electric insulation function.

By a layer or equivalent "with the basis" of a material M, this means a substrate, a layer, a device comprising this material M only or this material M and optionally other materials, for example alloy elements, impurities or doping elements.

An element or a portion of device is called electroactive, when it is configured to convert a force and/or a deformation into electric signal, and conversely. These conversions can be achieved thanks to physical phenomena, such as expansion, electrostriction, piezoelectric effect, state or phase change, thermoelectric effect, pyroelectric effect, etc.

A non-limiting example of the invention is applied to a microelectronic device comprising at the very least, on a substrate, a first current collector and a first electrode. In the sense of the present application, the term "collector" extends from a portion of the device having the function of connecting an electrode to an external element to the device, i.e. situated outside of the stack of layers of the device, generally encapsulated. The term "electrode" itself extends from a portion of the device in electric continuity with an active layer (in particular, an electrolyte, preferably solid, for the case of electrochemical storage or also a piezoelectric layer, for example). The current collector is connected to the electrode thereof, so as to establish an electric continuity between these two portions.

Generally, a storage system of the invention, of which an example can be seen in FIG. 1, can comprise a stack of layers on a support 1; it can be an inorganic material, such as glass or silicon, preferably covered with a dielectric silicon dioxide layer.

This stack allows to produce the different components of an electrochemical storage member, comprising a stack, itself comprising:
a first collector 2, a first electrode 3 (generally, the cathode, for example made of $LiCoO_2$ or made of another material requiring a thermal treatment, in particular for the crystallisation thereof); it can have a layer thickness, in particular comprised between 3 µm and 20 µm;

an electrolyte 4; this is preferably LiPON. The solid electrolyte or superionic materials with the basis of glass are among the best candidates for inorganic solid electrolytes, applicable to any totally solid battery. A large choice of sulphides and oxysulphide electrolyte vitreous systems have been developed, as well as a series of superionic sulphide ceramic glass $Li_2S$—$P_2S_5$, of which the $Li^+$ ion conductivity is compatible to that of liquid electrolytes. Concerning the electrolyte for sodium batteries, there is the same glass family, for example $Na_3PS_4$;

a second electrode 6;

and a second collector 5.

Overall, the sequence of these layer manufactures can be made with traditional microelectronic technologies. In particular, all of the layers above can be deposited by the technology known as PVD (physical vapour deposition). It can be solid plate deposition and each portion can be shaped by conventional photolithography and etching steps. A thermal treatment of the first electrode 3 can comprise an annealing under oxidising atmosphere at a temperature greater than or equal to 300° C., possibly greater than or equal to 500° C., even greater than or equal to 700° C.; this treatment is advantageously configured to crystallise it.

The electrolyte 4 is a portion inserted between the two conductive portions separated and constituted respectively of the first collector 2 and of the first electrode 3, and of the second electrode 6 and of the second collector 5.

Ionic exchanges between these two conductive portions are performed through the electrolyte 4, advantageously solid, according to the principle of storing electrochemical energy. A protection against external attacks, in particular against oxidation is possible by way of an encapsulation element, as represented by the layer 7 in FIG. 1; for information purposes, it can be silicon nitride. The latter advantageously covers all of the device, apart from the portions of collectors which must remain accessible through the outside for a contact point. Optionally, an additional protection, for example metal-based, can then be deposited.

The example given in reference to FIG. 1 falls into the field of storing energy electrochemically, by using an electrolyte advantageously in the form of a solid ionic conductor. However, other microelectronic devices are concerned by the present invention, by implementing equivalent steps for manufacturing the first collector and the first electrode, the following steps could vary according to the application. For example, the invention can be applied to active layers of an electroactive nature, in particular piezoelectric in sensors or in actuators, in particular. The electrolyte is therefore thus replaced by a piezoelectric layer then covered with the second electrode and of the second collector.

As indicated above, the production of an electrically conductive element, as is the case of the first collector 2 copes with significant stresses, in terms of electric conductivity level required and resistance to oxidation, in the environment of using the device and/or in the environment of the manufacture thereof, in particular when thermal treatment phases, comprising the oxygen species are in play.

An electrically conductive element is proposed here, including a plurality of layers and in particular, a bilayer system of which an example can be seen on the upper face of the support 1 in FIG. 2A. The first layer 21 is with the basis of at least one metal. Thanks to the second layer described below in detail, the choice of the material of the first layer 21 can be quite broad; it can be a layer with the basis of, or constituted of: copper, molybdenum, tungsten, aluminium, chromium, nickel. Advantageously, the thickness of this layer is greater than or equal to 15 nm and/or less than or equal to 200 nm. Advantageously, to favour the electric conductivity, a thickness of layer 21 can be selected, greater than or equal to 100 nm, and preferably greater than or equal to 150 nm; this allows to use a layer 22 of sufficiently high thickness to not make the manufacturing difficult, thickness for example greater than 50 nm, and preferably greater than or equal to 100 nm. Such a metal layer thickness also allows, in the event of a MoSi layer of 100 nm, to use all current metals with a satisfactory electric conductivity.

The second layer 22 is of the basis of, or is constituted of, $MoSi_x$ or $WSi_y$.

According to a possibility, the layers 21 and 22 are deposited by PVD, which can be done in the same equipment for these two layers. These two layers are formed on the upper surface of the substrate. By "support", this means an element which allows to receive the stack. Inserted layers can be present between the upper face of the substrate and the stack of layers 21, 22. Moreover, the device can comprise several substrates or supports and the electrically conductive element can be carried by only one of them.

The layers 21, 22 follow each other immediately, such that the upper face of the layer 21 is in contact with the lower face of the layer 22.

It is understood that the second layer 22 comes from Mo and Si species. The present invention proposes advantageous conditions for producing this layer. According to a first possibility, the Si and Mo species are co-sprayed on the substrate with the desired molar distribution; for example, in the case of a traditional cathodic spraying, it is sufficient to adjust the spraying rates of the two components. According to another possibility, a mixture of Mo and of Si is performed upstream, with the desired distribution and this mixture is itself sprayed on the substrate.

Another possibility is to carry out successive depositions of elementary Mo and Si layers, alternately. At least one Mo layer and at least one Si layer are thus deposited. The thickness thereof can be comprised between 1 nm and 10 nm; for example, elementary layers 2 nm thick can be retained for Mo and 5 nm thick for Si. Advantageously, it is arranged such that the resulting thickness of the layer 22 is 200 nm.

In the two cases above (spraying of mixture/co-spraying and laminated elementary layers), this deposition is subjected to a thermal treatment, for example a thermal treatment in the form of rapid thermal annealing at a temperature less than or equal to 600° C. These methods of preparation limit the thermal budget necessary for the manufacturing of the layer 22.

Moreover, the co-spraying or the spraying of a mixture can be favoured. Indeed, it has been observed that this manufacturing method allowed to limit the electric resistivity of the layer 23 potentially formed with an oxidising thermal treatment. At the same time, all of the deposition arrangements indicated above are satisfactory from the standpoint of surface tensions, so as to obtain a sufficient adhesion relative to the underlying layer.

In the table below, an example of thickness is given, advantageous for a layer 21 formed of a metal, according to the metal of which it is constituted, for a first case of a second layer made of MoSi, 100 nm thick, and a second case of a second layer made of MoSi, 200 nanometers thick, it all to obtain a level of electric resistivity sufficiently low to be used as a first collector in the example given in FIG. 1.

TABLE 1

| Metal | Min. thickness for 100 nm MoSi (nm) | Min. thickness for 200 nm MoSi (nm) |
|---|---|---|
| Cu | 20 | 15 |
| Mo | 90 | 80 |
| W | 90 | 80 |
| Al | 26 | 23 |
| Cr | 130 | 112 |
| Ni | 70 | 60 |

FIG. 2B shows that the conductive element can comprise an additional layer 23 coming from an oxidation, in particular when this element is subjected to external oxidising conditions during the manufacturing of the remainder of the device. This will typically be an oxide layer of the material of the second layer 22.

In practice, it has been observed that the thickness of the layer 23, under the conditions of the thermal treatment necessary for the crystallisation of the first electrode (strong oxidation conditions by rapid thermal annealing at 600° C. for 30 minutes, under dioxygen flow), remains very low, which allows to not make this step too unfavourable to the final electric conductivity of the first collector. If the oxidation was too significant, the electric resistance would rapidly increase. It will be noted that the limited oxidation performance of the MoSi silicide alloy (in particular, when x=1) is noteworthy.

To verify the electric properties of the conductive element thus constituted, tests have been performed based on a simple electric mounting corresponding to the illustration of FIG. 2C: a pad 24 has been provided on the surface of the conductive element and an access to the first layer 21 has been opened. In this way, a measurement of electric conductivity through the element, from the layer 21 to the pad 24, has been able to be taken under different conditions.

FIG. 3 presents a graph comparing the evolution of the electric resistivity, according to the parameter X of MoSi$_x$, of an element according to FIG. 2C obtained by co-spraying (with annealing at 600° C. under oxidising atmosphere (for 30 minutes for the curve A, and without annealing for the curve B), with a resulting layer 22 thickness of 100 nm. To insulate the electric resistivity parameters of the layer 22, in the context of FIG. 3, the layer 22 has been directly formed on the substrate, so as to measure conditions specific to this layer, in the absence of layer 21.

The two curves are monotonous and have an increase in resistivity with the increase of X. Consequently, it appears that the best molar distribution in terms of electric conductivity corresponds to X=1. This result is surprising insofar as, under these conditions, the material appears well crystallised, while it subsequently becomes clearly more amorphous, and in particular in the case where X=2 for which the applicant has observed that it was almost amorphous.

It will be noted that X is not necessarily a natural integer. It can in particular take decimal values, such as those comprised between 1 and 2 in FIG. 3. This is the same for the parameter Y of WSi$_y$. Moreover, studies by diffractometry of X-rays can be used to determine the amorphous or well crystallised character of the material MoSi$_x$ (which can comprise MoSi$_2$ and Mo$_5$Si$_3$ phases in the observation) and of the material WSi$_y$ (in particular, WSi$_2$ and W$_3$Si$_5$). The performance is similar for WSi$_y$ relative to MoSi$_x$, and in particular, WSi$_2$ and W$_3$Si$_5$. Indeed, these two materials fall under a very good resistance against the degradation to the temperature under oxidising atmosphere (for example, air). WSi$_2$ remains amorphous over a large range of temperature, then passes into crystalline phase beyond 580° C. Regarding W$_3$Si$_5$, it is amorphous up to 529° C. and crystalline beyond that. They can in particular be used with thicknesses deposited, equivalent to those given in the example of MoSi$_x$.

Still to characterise only the layer 22, the curve of FIG. 4 presents the evolution of the resistance of the layer 22 according to the thickness thereof, under the conditions of preparation of the layer 22 indicated for FIG. 3, by only retaining the embodiment wherein X=1 (MoSi). The electric resistance decreases very rapidly. By fixing a total resistance value which suits 30, referenced by the letter M in the figure, it is noted that a very significant thickness of layer 22 only would be necessary to reach a satisfactory level of conductivity.

The first layer 21 provides a solution to this difficulty, thanks to the invention. The curves of FIGS. 5 to 6 indeed show evolutions of total resistance, i.e. of the completely electrically conductive element comprising the layer 21, the layer 22 and the oxide layer 23, under the conditions of FIG. 2C.

In the case of FIG. 5, the first layer is made of molybdenum, with several thicknesses tested. The second layer 22 is made of MoSi with a thickness of 100 nm. A rapid fall in total electric resistance is immediately noted, the indicative target M is reached from a thickness of 90 nm, which is very reasonable.

In the case of FIG. 6, the first layer is made of copper, with several thicknesses tested. The second layer 22 is identical to that used for the case of FIG. 5. As in this case, a rapid fall in total electric resistance is noted. In particular, the indicative target M is reached from a thickness of 16 nm of copper.

The results above show that the combination of the first layer and of the second layer of the invention ensures levels of electric resistance which can easily be adapted to the targeted application. In particular, to produce electrochemical storage device collectors, the target M indicated on the curves is broadly satisfactory and the practical production is easy. For example, if a copper layer 21 of 200 nm and a MoSi layer 22 of 200 nm are retained, the overall resistance obtained is 0.55Ω, which leaves a large margin with respect to the acceptable levels of resistance of the field.

FIG. 7 seeks to examine the impact of an oxidising thermal treatment on the electric results of the stack (corresponding to the pair of layers 22 and 23) of materials proposed in the invention. In the preceding cases, the measurements had been taken with a condition of thermal treatment under dioxygen at 600° C. for 30 minutes. For the case of FIG. 7, several temperature levels are tested, with increasing oxidation times (corresponding to the thermal treatment time). The curve O1 corresponds to a treatment temperature of 550° C.; the curve O2 corresponds to 600° C.; the curve O3 corresponds to 650° C.; the curve O4 corresponds to 700° C. The indicative target of resistance M is identical to the preceding case, at 3Ω. The resistance provided is that of the oxide layer formed during the treatment. A measurement of the intensity and of the tension easily allows to determine this resistance.

It is noted that all of the results are satisfactory, in this sense that the electric resistance has a significant inflexion with the increase of the oxidation time. Thus, the increase of this resistance is measured. It is all the truer for the cases O1, O2 and O3 for which, the indicative target M is not reached, despite oxidation times going up to two hours. Even for the case O4, corresponding to a temperature of 700° C., the increase of resistance measured remains well below the indicative target M up to more than one hour of treatment.

Generally, it is confirmed that the total electric resistance remains absolutely suitable, at least up to an oxidation time lower than or equal to one hour. Then, the total electric resistance increases more significantly. It will be noted that up to 20 minutes, even 40 minutes, the duration of the thermal treatment does not impact on or hardly impacts on the resistance.

In practice, a thermal treatment of a duration less than or equal to 60 minutes guarantees sufficiently low electric resistance conditions, to respect the indicative target M, and this, whatever the temperature conditions, even high (700° C.). For temperatures less than or equal to 650° C., the thermal treatment time even has hardly any impact on the result, which leaves a great freedom of choice of treatment parameters of the devices being manufactured.

The invention is not limited to the embodiments described above, and extends to all the embodiments covered by the claims.

The invention claimed is:

1. A microelectronic device, comprising:
   a support; and
   an electrically conductive element comprising in a stack and successively above a first face of the support, a first layer based on a metal and a second layer, in contact with the first layer, based on a material selected from among MoSi and $WSi_y$,
   wherein the electrically conductive element is a battery collector, and
   wherein the electrically conductive element further comprises, above and in contact with at least one portion of the second layer, an oxide layer of the material of the second layer.

2. The microelectronic device according to claim 1, wherein the material selected is MoSi.

3. The microelectronic device according to claim 1, wherein a thickness of the second layer is less than or equal to 100 nm.

4. The microelectronic device according to claim 1, wherein the metal is selected from among: Cu, Mo, W, Al, Cr, and Ni.

5. The microelectronic device according to claim 1, comprising:
   a second face of the first layer disposed on the first face of the support,
   the first layer having a third face opposite the second face,
   a fourth face of the second layer disposed on the third face,
   the second layer having a fifth face opposite the fourth face, and
   the oxide layer of the material of the second layer formed directly on the fifth face.

6. The microelectronic device according to claim 1, further comprising a first current collector formed at least partially by the electrically conductive element, a first electrode, a solid active layer, a second electrode, and a second current collector.

7. The microelectronic device according to claim 1, wherein the electrically conductive element forms at least partially an electrode, electrically connected to an electroactive member, configured to convert a force and/or a deformation into an electric signal, and conversely.

8. The microelectronic device according to claim 1, wherein the electrically conductive element forms at least partially an electric circuit portion.

9. The microelectronic device according to claim 1, wherein the electrically conductive element forms an antenna portion, a portion of an inductive element, or a portion of a capacitive element.

10. A method for manufacturing the microelectronic device comprising the electrically conductive element according to claim 1, the method comprising:
    providing the support; and
    above a first face of the support, forming the stack comprising successively forming the first layer based on the metal, and, in contact with the first layer, forming the second layer based on the material selected from among MoSi and $WSi_y$.

11. The method according to claim 10, wherein the forming of the second layer comprises a deposition by a co-spraying or a spraying of a mixture, respectively, of Mo and of Si, or of W and of Si, on a face of the first layer.

12. The method according to claim 10, wherein the forming of the second layer comprises an alternate deposition, on a face of the first layer, of at least one sublayer, respectively, of Mo or of W, and of at least one Si sublayer.

13. The method according to claim 11, wherein the forming of the second layer further comprises, after the deposition, a thermal treatment configured to form MoSi or, respectively, $WSi_y$ molecules.

14. The method according to claim 13, wherein the thermal treatment is performed in a presence of dioxygen.

15. The method according to claim 10, wherein the microelectronic device is configured for storing electrochemical energy, and the method further comprises a step of forming an electrode, and a thermal treatment configured to produce a crystallisation annealing of the electrode.

16. The method according to claim 15, wherein the electrode is LiCo-based, the thermal treatment being further configured to produce the crystallisation annealing of the electrode so as to form $LiCoO_2$.

17. The method according to claim 10, wherein an electrical resistance of the electrically conductive element is less than or equal to 3 ohms.

18. The microelectronic device according to claim 1, wherein a resistance of the stack on which the oxide layer of the material of the second layer is formed is no more than 3Ω.

19. The microelectronic device according to claim 5, wherein a resistance of the stack on which the oxide layer of the material of the second layer is formed is no more than 3Ω.

* * * * *